United States Patent [19]

Williams et al.

[11] Patent Number: 5,713,243
[45] Date of Patent: Feb. 3, 1998

[54] TWO-PIECE SECTOR PLATE FOR A TRANSFER CASE

[75] Inventors: Randolph C. Williams, Weedsport; Burton N. Luther, Canstota; Nanda K. Ambady, Cicero, all of N.Y.

[73] Assignee: New Venture Gear, Inc., Troy, Mich.

[21] Appl. No.: 551,327

[22] Filed: Nov. 1, 1995

[51] Int. Cl.⁶ ............................................. B60K 20/00
[52] U.S. Cl. ........................... 74/475; 74/337.5; 74/569
[58] Field of Search ................ 74/567, 569, 337.5, 74/475

[56] References Cited

U.S. PATENT DOCUMENTS

| | | |
|---|---|---|
| 2,772,652 | 12/1956 | Du Shane et al. . |
| 2,784,608 | 3/1957 | Jozif ............................ 74/337.5 |
| 4,531,423 | 7/1985 | Fogelberg ...................... 74/475 |
| 4,664,217 | 5/1987 | Welch et al. ................. 74/337.5 |
| 4,704,917 | 11/1987 | Hiroyasu . |
| 4,770,280 | 9/1988 | Frost . |
| 4,827,792 | 5/1989 | Uetake ........................... 74/475 |
| 5,076,112 | 12/1991 | Williams . |
| 5,159,847 | 11/1992 | Williams et al. . |

*Primary Examiner*—Charles A. Marmor
*Assistant Examiner*—David M. Fenstermacher
*Attorney, Agent, or Firm*—Harness, Dickey & Pierce, P.L.C.

[57] ABSTRACT

A two-piece sector plate is employed in an automotive vehicle transfer case. The sector includes a rotatable body and a cam block movably coupled thereto with a biasing device disposed therebetween. A shift rail mode pin rides along a camming surface of the cam block and along a camming surface of the sector body, wherein the camming surfaces have different radii. A method of operating the two-piece sector plate is also provided.

32 Claims, 7 Drawing Sheets

TWO-PIECE SECTOR PLATE FOR A TRANSFER CASE

BACKGROUND OF THE INVENTION

The present invention relates to a shift arrangement for automotive vehicle transmissions and, more particularly, to an improved two-piece sector plate incorporated into a transfer case shift mechanism.

In general, power transfer mechanisms, such as transfer cases, are operatively associated with both manual and automatic transmissions for selectively directing power to the non-driven wheels of a motor vehicle upon shifting from a two-wheel drive mode to a four-wheel drive mode. More particularly, most conventional transfer cases use a transmission type synchronizer clutch arrangement incorporated with a shift fork mechanism to provide "shift-on-the-fly" two-wheel drive to four-wheel drive mode shifting. When shifting the transfer case between the two-wheel and four-wheel drive operating modes, selective movement of a shift lever by the vehicle operator causes corresponding rotation of a single-piece sector plate. A mode pin, secured to the shift fork mechanism slidably mounted on a shift rail, is biased into engagement with a cam edge surface of the sector plate so as to be axially displaced upon rotation of the sector plate. As such, the shift fork mechanism slides on the shift rail for travel between positions defining the two and four-wheel operating modes. Moreover, movement of the shift fork mechanism toward the four-wheel drive position acts to energize the synchronizer clutch apparatus for shifting a clutch sleeve into engagement with the external spline of a silent chain carrier. In this manner, the transfer case is "locked-up" in the four-wheel drive operating mode for delivering power to the vehicle's front and rear axle output shafts.

A common problem associated with many conventional part-time transfer cases is that during cold weather conditions it is often extremely difficult to shift into the four-wheel drive mode. In manually actuated part-time transfer cases, the vehicle operator is required to exert an abnormally large input force on the shift lever to physically overcome the excessive shift resistance associated with "cold" shifting into the four-wheel drive operating mode. This increased shift effort is due primarily to the increased viscosity of the lubricant entrained within the front axle final drive assembly which causes viscous drag loading on the transfer case front output shaft. Under such conditions, the synchronizer clutch apparatus cannot generate sufficient frictional torque loading to effectively complete the speed synchronization process between the front and rear output shafts.

However, this cold weather phenomenon is largely temperature dependent in that the increased shift effort is generally experienced only upon attempting to shift into the four-wheel drive mode immediately after cold starting of the vehicle. Once the vehicle has been in four-wheel drive operation for a short period of time or two-wheel drive operation for a longer period of time, the temperature of the lubricant increases while its viscosity decreases so as to restore relatively normal shifting operation of the synchronizer clutch unit. As will be appreciated, it is undesirable to require the vehicle operator to physically overcome the high shift resistance when manually shifting into the four-wheel drive operating mode. Moreover, under extreme cold temperature conditions it may not only be difficult, but virtually impossible for the vehicle operator to shift the transfer case into the four-wheel drive mode until the fluid temperature has increased above a minimum threshold value.

An improved transfer case sector plate is disclosed in U.S. Pat. No. 5,076,112 entitled "Easy Shift Sector for Transfer Case" which issued on Dec. 31, 1991 to the inventor of the present invention. This patent is incorporated by reference herewithin. While this patent has dramatically improved the cold weather shifting of a transfer case through enhanced sector plate cam edges, it nevertheless exhibits tooth-butt and double-bump synchronization force disadvantages as were also present with prior sector plates. Tooth-butt occurs when the clutch teeth do not properly engage thereby leading to an abortion of the mode shift. Furthermore, the double-bump situation is caused by unequal force application over the traditional six phases of synchronization.

SUMMARY OF THE INVENTION

In accordance with the present invention, a preferred embodiment of a two-piece sector plate is employed in an automotive vehicle transfer case. The sector includes a rotatable body and a cam block movably coupled thereto with a biasing device disposed therebetween. A method of operating the two-piece sector plate is also provided.

The two-piece sector plate of the present invention is advantageous over prior constructions and that the present invention changes the operable and effective sector profile radius through movement of the cam block in relation to the body. When the cam block is fully compressed toward the body, a smaller operating radius is achieved thereby generating increased synchronizer torque for a given input force while also allowing for a smoother shift as observed by the vehicle driver. Furthermore, the present invention is advantageous such that if tooth-butt occurs, the biasing device compresses so as to allow the cam block to rock toward the body. Subsequently, the shift is indexed past the tooth-butt condition whereafter the biasing device rebounds to push the cam block back out and away from the body so as to complete the shift. Additionally, the present invention two-piece sector plate eliminates the double-bump scenario by dampening high and low driver input forces that would otherwise result due to the different synchronization phase force requirements. Moreover, the two-piece sector plate of the present invention is almost dimensionally equivalent to that of many prior sector plates; with minor modifications it allows for easy replacement and installation of the present invention into presently tooled transfer cases with minimum transfer case, switch placement or operating environment changes. Further advantages and features of the present invention will become apparent from the following description and appended claims, taken in combination with the accompanying drawings.

DETAILED DESCRIPTION OF THE PREFERRED EMBODIMENT

Figure 1:
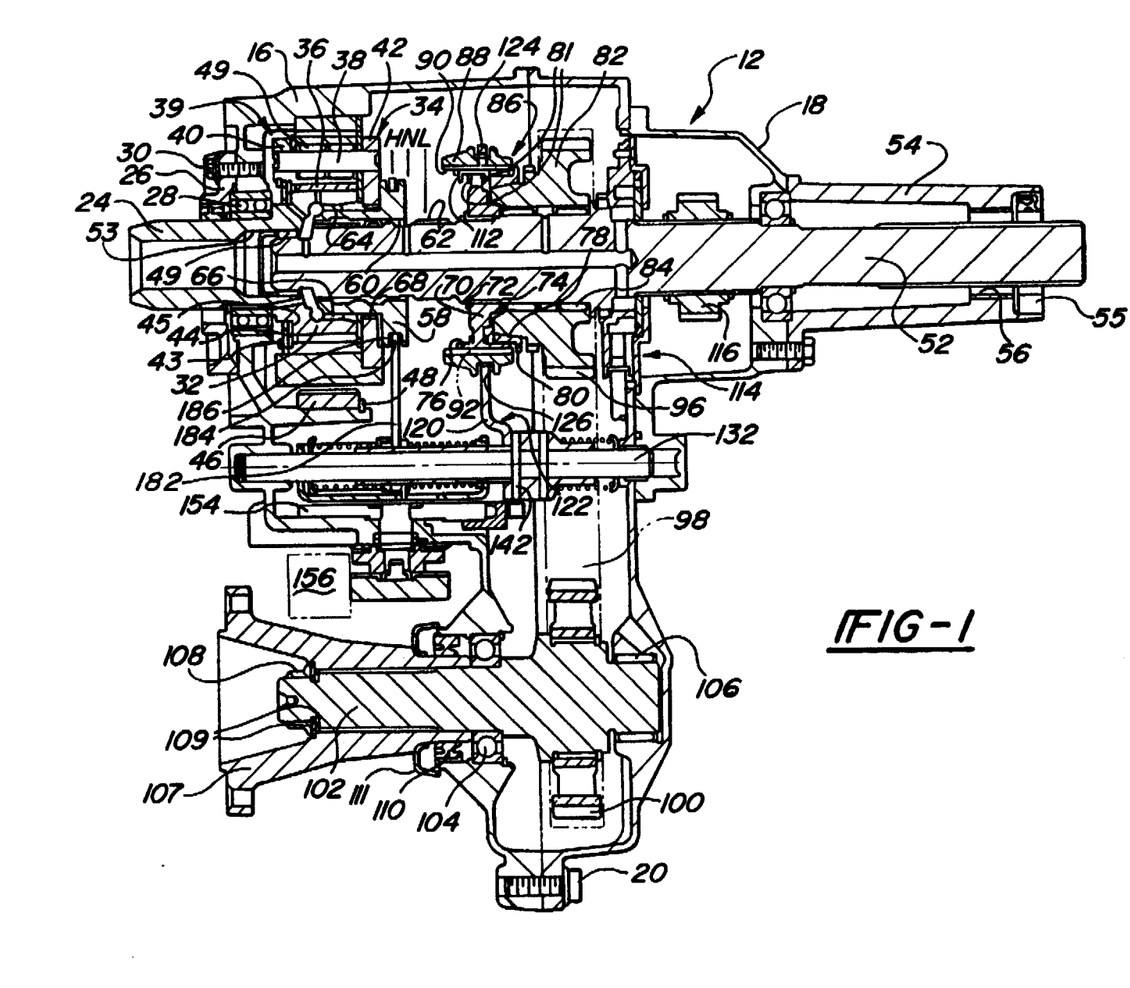
FIG. 1 is a cross sectional view showing the preferred embodiment of a two-piece sector plate of the present invention employed in a transfer case.

Referring to FIG. 1, an exemplary transfer case 12 is shown which includes a housing assembly formed by front and back housing sections 16 and 18, respectively, fastened together by a plurality of threaded screws 20. Front housing section 16 receives a transmission output shaft (not shown) within an internally splined tubular input stub shaft 24. Input stub shaft 24, driven by an engine (not shown) of an automotive vehicle, is shown rotatably mounted in an input bearing retainer or collar portion 26 of front housing section 16 by an input bearing assembly 28 with collar portion 26 secured by screws 30 to front housing section 16.

Input shaft 24 is provided for transferring power to a planetary gear assembly or the like having a "high-range" direct drive position, a "low-range" position providing reduction ratio drive, and a "neutral" position for disengaging the torque transfer. One exemplary planetary gear assembly 34 is shown to include an input sun gear 32 integrally formed on input stub shaft 24. Sun gear 32 is shown meshed with a plurality of planet gears 36. Each planet gear 36 is rotatably journalled on a pinion shaft 38 supported in a planetary carrier 39. Six pinion shafts 38 and planet gears 36 are employed. Planetary carrier 39 includes fore and aft ring members 40 and 42, respectively, secured by bolts (not shown). A carrier retainer ring 43, lock ring 44 and gear thrust washer 45 are also provided. Planet gears 36 mesh with a helical annulus gear 46 mounted via a splined press-fit to an inner surface of front housing section 16. Annulus gear 46 is additionally retained against rearward axial movement away from its stop shoulder by a plurality of radially disposed locking tabs or annulus retainer rings 48 each suitably fixed to front housing section 16. Needle bearings 49 are used throughout.

With continued reference to FIG. 1, transfer case 12 includes a first output in the form of a rear axle output or central shaft 52 which is aligned on the longitudinal axis of input shaft 24 and has a forward end journalled in an input shaft axial bore 53. The rearward end of central shaft 52 is adapted for connecting a rear prop shaft (not shown) for driving the rear axle of a motor vehicle. A housing extension 54 contains an oil seal 55 and a bushing 56 surrounding a section of central shaft 52 adjacent to its rearward end.

Central shaft 52 has a range collar or sleeve 58 axially slidable thereon by means of collar internal splines 60 engaged with external splines 62 on central shaft 52. Range collar 58 is formed with external spline teeth 64 shown slidably engaged with internal sun gear spline teeth 66 located in an axial counterbore in the right or aft end of input shaft 24. Torque or power flow is transferred directly from input shaft 24 to central shaft 52 through engagement of spline teeth 64 and 66 and the engagement of range collar internal splines 60 and central shaft external splines 62 for establishing the direct "high-range" position indicated by the construction line "H".

Carrier aft ring 42 includes internal spur gear teeth 68 formed concentric with range collar 58 which are placed in sliding meshed engagement with collar external spline teeth 64 upon range collar 58 being slid aft for defining the "low-range" position indicated by the construction line "L". In addition, when range collar 58 is moved rearwardly a predetermined distance from its high-range position, its external teeth 64 are disengaged from internal sun gear spline teeth 66 for providing the "neutral" drive range position indicated by construction line "N". Thus, in the neutral position no driving torque is transmitted to central shaft 52, whereby no power is supplied to the vehicle's rear wheels. However, it is to be understood that planetary gear assembly 34 is merely exemplary of the numerous speed reduction mechanisms suitable for use with the present invention.

A hub member 70 is fixedly splined to central shaft 52 by a snap ring 72 and a stop shoulder 74 formed thereon. Hub member 70 has an outer cylindrical hub portion 76 which generally encircles a blocker ring 78. Radially extending external teeth 80 are formed at an aft end of blocker ring 78. A pair of annular springs 81 are also provided. In addition, a chain carrier 82 is rotatably journalled by needle bearings 84 on central shaft 52. Chain carrier 82 can be selectively coupled for rotation to hub member 70 and, in turn, central shaft 52 by a synchronizer apparatus, generally indicated at 86.

Synchronizer apparatus 86 preferably depicted in the present embodiment is a conventional strut-type single-cone synchronizer clutch similar to that shown and described in the U.S. Pat. No. 4,770,280 which issued on Sep. 13, 1988 to Frost, the disclosure of which is expressly incorporated by reference herewithin. It is to be understood, however, that virtually any other type of transmission synchronizer apparatus could be used without departing from the scope of the present invention. For example, another synchronizer apparatus suitable for use with the present invention is disclosed in U.S. Pat. No. 3,700,083 which issued on Oct. 29, 1972 to Ashikawa et al.; this is commonly referred to as "strutless" type synchronizer. Furthermore, chain carrier 82 could be in the form of other gear means, such as a speed gear member journally mounted in a transmission speed shaft or the like, without departing from the scope of the present invention.

An axially shiftable clutch sleeve 88 of synchronizer apparatus 86 is shown in a central disengaged two-wheel mode position. Clutch sleeve 88 is formed with internal spline teeth 90 which are in constant axial sliding engagement with external spline teeth 92 formed on cylindrical hub portion 76. Thus, clutch sleeve 88 may be axially shifted from the two-wheel drive mode position toward the four-wheel drive mode position to complete lock-up wherein internal spline teeth 90 drivingly engage external spline teeth 94 of chain carrier 82. Chain carrier 82 includes a drive sprocket 96 drivingly engaging a 1.25 inch wide chain, shown in dashed lines at 98, which is coupled to a lower driven sprocket 100. Driven sprocket 100 is, in turn, coupled to a second output which is shown as a forwardly extending front axle output shaft 102. Front output shaft 102 is mounted for rotation within front housing section 16 by a ball bearing assembly 104 and in rear housing section 18 by a roller bearing assembly 106. Front output shaft 102 is suitably connected to a coupling flange 107 by a nut 108 and washers 109, as well as their mating splines, for driving the front wheels. Reference may be had to U.S. Pat. No. 4,381,828 issued May 3, 1983, to Lunn et al. for details of a typical transfer case mounting showing its connection to a motor vehicle's front and rear drive axles. The disclosure of the Lunn et al. patent is expressly incorporated by reference herein. Furthermore, an oil seal 110 and slinger 111 are provided.

Synchronizer apparatus 86 includes a thrust mechanism which is provided for moving blocker ring 78 toward chain carrier 82 upon rearward shifting movement of clutch sleeve 88. Moreover, in strut-type blocking synchronizer 86 the thrust mechanism comprises the pair of energizing circular retainer springs 81 that are compressed and inserted between a plurality of circumferentially spaced key-like struts, generally indicated at 112. Each of the three struts 112 are biased outwardly in their respective longitudinally extending slots formed in cylindrical hub portion 76. Struts 112 each have a raised central "bump" portion which engage a corresponding detent groove or recess formed in sleeve external spline teeth 92 with clutch sleeve 88 being disposed in its neutral position. Rearward movement of synchronizer blocker ring 78 results in frictional loading between a blocker ring inner conical surface and a mating chain carrier outer conical surface by outward thrusting of struts 112. The transfer case also includes a GEROTOR oil pump 114 and a tone wheel or electromagnetic speedometer enmeshed with shaft 52.

Figure 2:
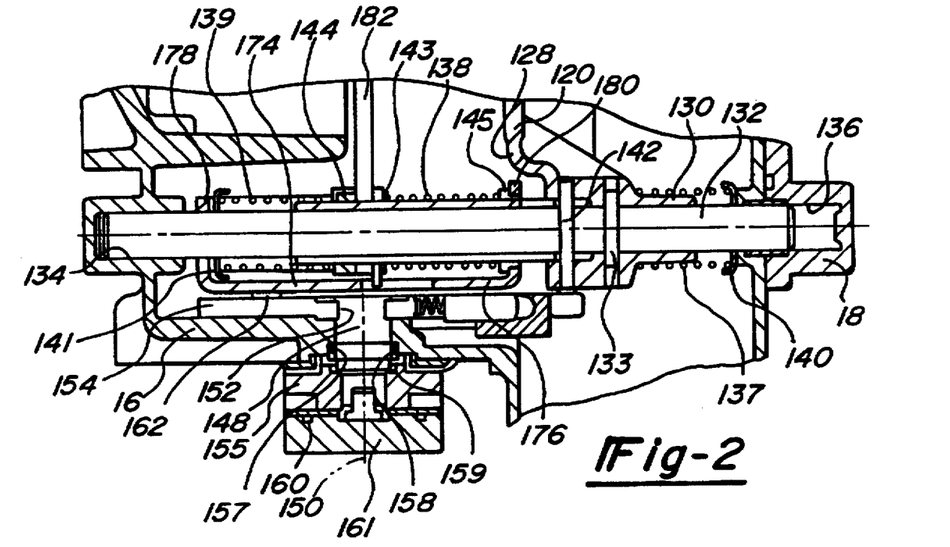
FIG. 2 is an enlarged cross sectional top elevational view, similar to that of FIG. 1, showing the preferred embodiment two-piece sector plate of the present invention and the transfer case.

As can be observed in FIGS. 1 and 2, a mode fork 120 of a shift fork assembly 122 has forked projections 124 engaged in an annular groove 126 formed in clutch sleeve 88. Mode fork 120 includes an arm 128 integrally formed with a longitudinally extending cylindrical tube member 130. A shift rail 132 is received within tube member 130 and coupled thereto by a pin 133. The shift rail's opposite ends are suitably supported in fore and aft sockets 134 and 136, respectively, formed in housings 16 and 18. Tube member 130 is also fixed for limited axial movement with shift rail 132 by a mode pin 142. Moreover, mode fork 120 is normally biased toward the two-wheel drive mode position by springs 137, 138 and 139 which are disposed between cups 140 and 141, a bushing 145, a thrust washer 143 and a spacer 144 as is illustrated in the figures.

A rotatable actuating shaft 148 is supported in the interior of transfer case housing 16 for rotation about its axis 150. A first end of actuating shaft 148 is secured in an orifice 152 formed in a sector plate 154. A motor sector gear 155, driven by a 12 volt DC electric motor 156, is suitably connected to an opposite end of actuating shaft 148 for rotating actuating shaft 148 and sector plate 154 about axis 150 under the selective control of the vehicle operator. It will be understood that actuating shaft 148 can be alternately rotated in a manual manner by a shift lever and shifter assembly without departing from the fair scope of the present invention. An O-ring seal 157, an O-ring retainer 158, a retaining ring 159, an encoder seal 160, an absolute encoder 161 and a roller 162 are also preferably employed.

Figure 3A:
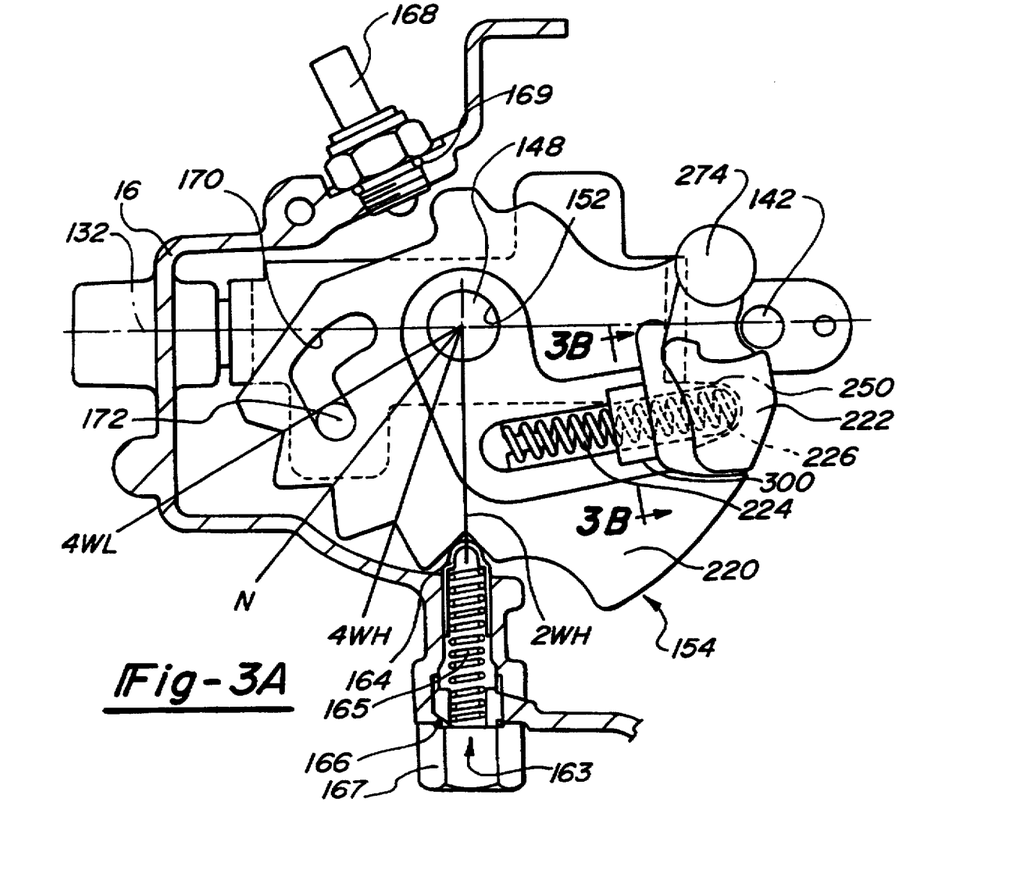
FIG. 3A is a side elevational view, taken partially in section, showing the preferred embodiment two-piece sector plate of the present invention and the transfer case.

It can be seen in FIG. 3A that sector plate 154 may be rotated by actuator shaft 148 to any of four selected operating positions indicated by the four distinct sector notches labeled "2WH", "4WH", "N" and "4WL" each successively engageable by a spring biased plunger assembly 163. Plunger assembly 163 includes a poppet plunger 164, a plunger spring 165, an O-ring seal 166 and a poppet screw 167. A four wheel drive indicator switch 168 and O-ring seal 169 are also mounted to housing 16.

In addition, sector plate 154 has an elongated, multi-angled and contoured (in a somewhat arcuate V-shaped configuration) slot 170 formed therein into which a range pin 172 extends. Range pin 172 is mounted in a base portion 174 of a U-shaped range bracket 176. Range bracket 176 includes a pair of fore and aft flanges 178 and 180, respectively, extending normal to base portion 174. Forward flange 178 has an aperture therein sized for slidably receiving shift rail 132. Similarly, range bracket aft flange 180 is provided with an aperture also sized for the reception of shift rail 132. A range fork and sleeve assembly 182, having forked projections 184 (see FIG. 1) engaged in an annular groove 186 (also see FIG. 1) of range collar 58, is affixed to bracket 176.

Figure 4:
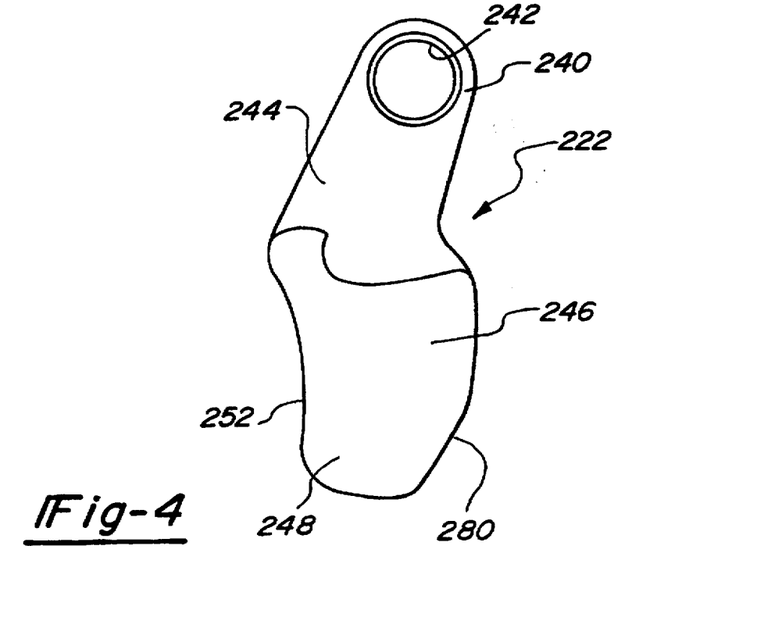
FIG. 4 is an enlarged top elevational view showing a cam block employed in the preferred embodiment two-piece sector plate of the present invention.
Figures 5, 7:
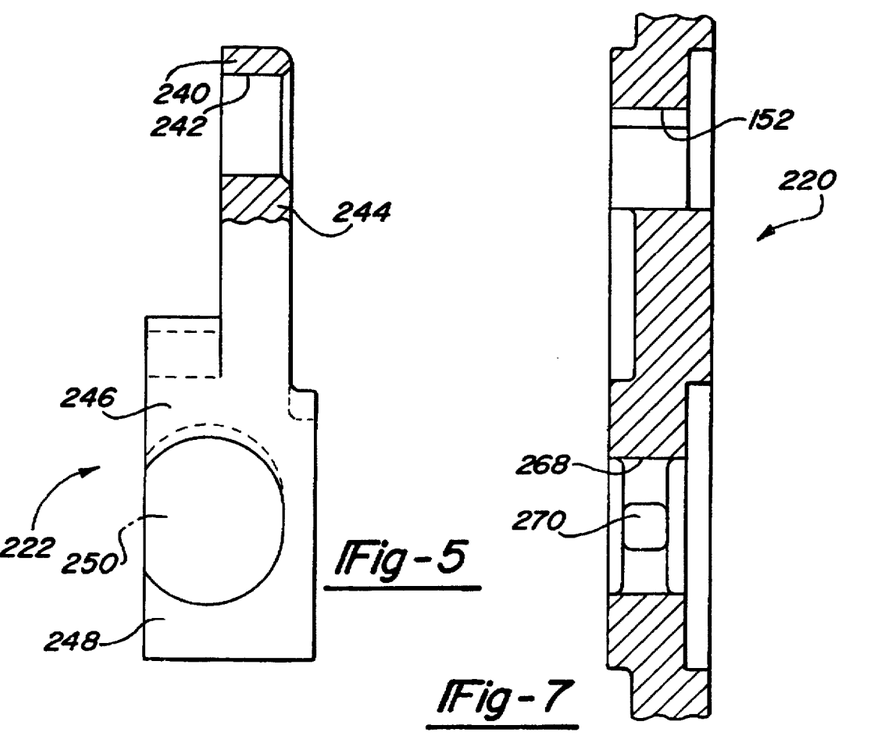
FIG. 5 is an edge elevation view, taken partially in section, showing the cam block employed in the preferred embodiment two-piece sector plate of the present invention.
FIG. 7 is a cross-sectional view, taken along line 7—7 of FIG. 6, showing the body employed in the preferred embodiment two-piece sector plate of the present invention.

As can best be observed in FIGS. 2 and 3A, sector plate 154 includes a cam body 220, a cam block 222, a compression poppet spring 224 and a poppet 226. Referring to FIGS. 4 and 5, cam block 222 has a proximal portion 240 with a chamfered opening 242 therethrough. Cam block 22 further has a neck portion 244 extending from proximal portion 240 to a thickened portion 246 adjacent to a distal portion 248. A spring receiving cavity 250 is disposed within said thickened portion and is open to a peripheral edge 252 thereof.

Figure 6A:
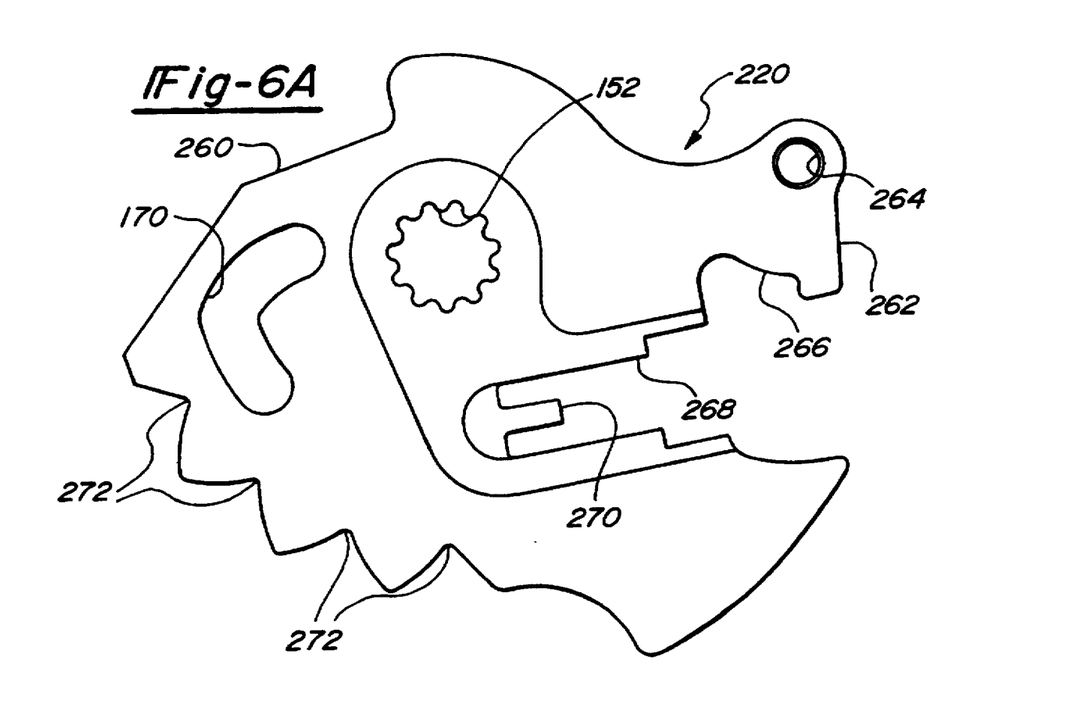
FIG. 6A is an enlarged plan elevational view showing a body employed in the preferred embodiment two-piece sector plate of the present invention.

FIGS. 6 and 7 specifically illustrate body 220. Body 220 includes a peripheral edge 260 having a camming edge profile segment or surface 262 generally located between a chamfered opening 264 and a receptacle 266. An elongated cavity 268 inwardly extends from receptacle 266. An elongated finger 270 centrally and longitudinally extends from within a bottom of elongated cavity 268. Four indentations 272, separated by closely spaced peaks are disposed along a second segment of peripheral edge 260 of body 220 so as to define the two wheel high, four wheel high, neutral and four wheel low positions as previously described.

As can be observed in FIGS. 3A, 4 and 6A, a pivot pin 274 pivotably couples openings 242 and 264 of cam block 222 and body 220, respectively. Spring 224 has a first end which surrounds finger 270 and has a second end encased within poppet 226. Poppet 226 rides along cavity 268 such that a semi-spherical end thereof fits within receptacle 250 of cam block 222. Thus, spring 224 normally acts to outwardly bias thickened portion 246 of cam block 222 away from the adjacent portion of body 220. When spring 224 is fully compressed, it will generate approximately between 50 and 70 lbs. of force. Moreover, thickened portion 246 of cam block 222 is movably disposed within receptacle 266 of body 220. A camming surface 280 of cam block 222 and camming surface 262 of body 220 define an operatively continuous sector plate camming profile or surface for moving shift rail mode pin 142 which rides therealong.

Figure 3B:
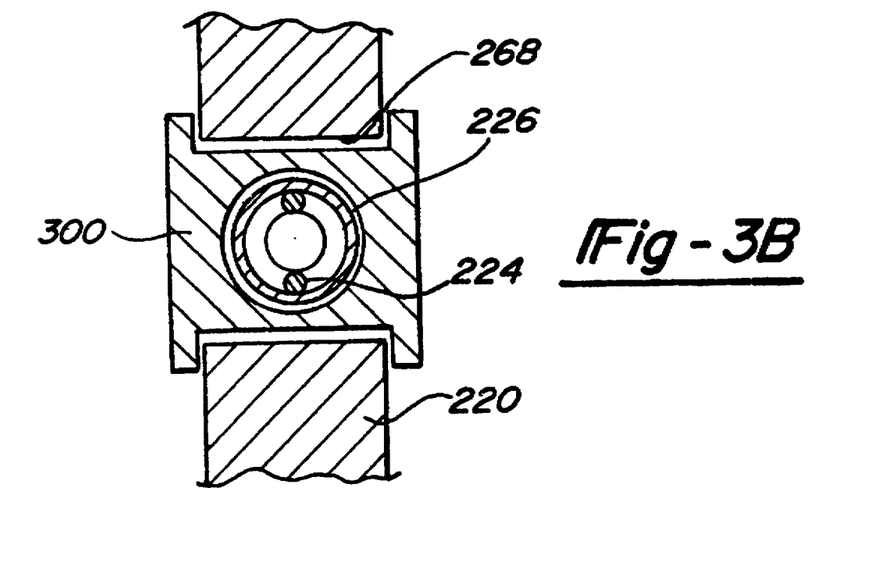
FIG. 3B is a cross sectional view, taken along line 3B—3B of FIG. 3A, showing a poppet retainer employed in the preferred embodiment two-piece sector plate of the present invention.
Figure 6B:
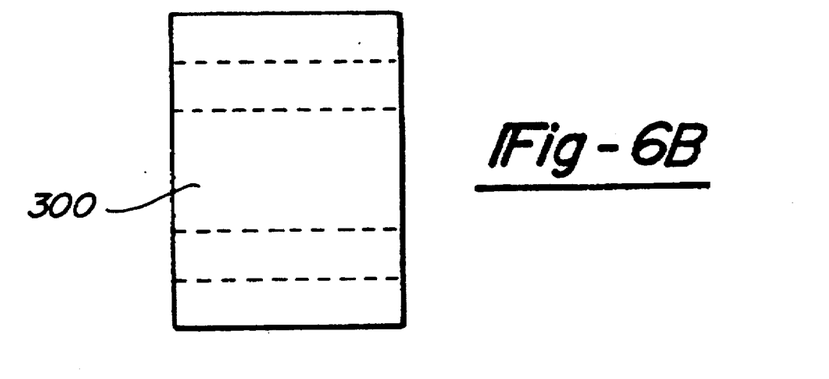
FIG. 6B is a side elevational view showing the poppet retainer employed in the preferred embodiment two-piece sector plate of the present invention.

FIGS. 3B and 6B show a poppet retainer 300 affixed to body 220. Poppet retainer 300 has a longitudinal aperture aligned with cavity 268 within which poppet 226 rides; this prevents spring 224 from buckling. Poppet retainer 300 is preferably made from steel but could alternately be injection molded from an engineer grade polymeric material.

Cam block 222 is preferably machined from steel-SAE 1018; MS 2485 B. The heat treatment for this part is: carbonitride P.S.-8-0612; case depth 0.010–0.020; hardness R/15 N-90 minimum. Further, body 220 is preferably machined from steel-SAE 1010–1020; MS 3413 or MS 210 G. Body 220 has the following heat treatment: carbonitride; case depth 0.010–0.020; oil quench and temper; hardness R/15 N-90 minimum; P.S.-8-0600.

Referring to FIGS. 1 and 3A, when the vehicle operator desires to shift the transfer case from the two-wheel drive high-range (2WH) to the four-wheel drive high-range (4WH), electric motor 156 is selectively energized for causing corresponding counterclockwise rotation of actuating shaft 148 and sector plate 154 through a predetermined angle for coupling chain carrier 82 to central shaft 52 via actuation of synchronizer apparatus 86. Therefore, in accordance with the principles of the present invention, the two-piece sector plate will reduce shift effort because as the spring compresses and allows the cam block to rock back, the angle between the normal force and the axial direction along the shift rail decreases. Thus, the reduction of this angle results in an increased percentage of driver or electrical motor input actually being input to move the clutch sleeve and complete the shift. This is felt as lower shift efforts especially when manually shifted.

Figures 8A, 8B, 8C, 8D:
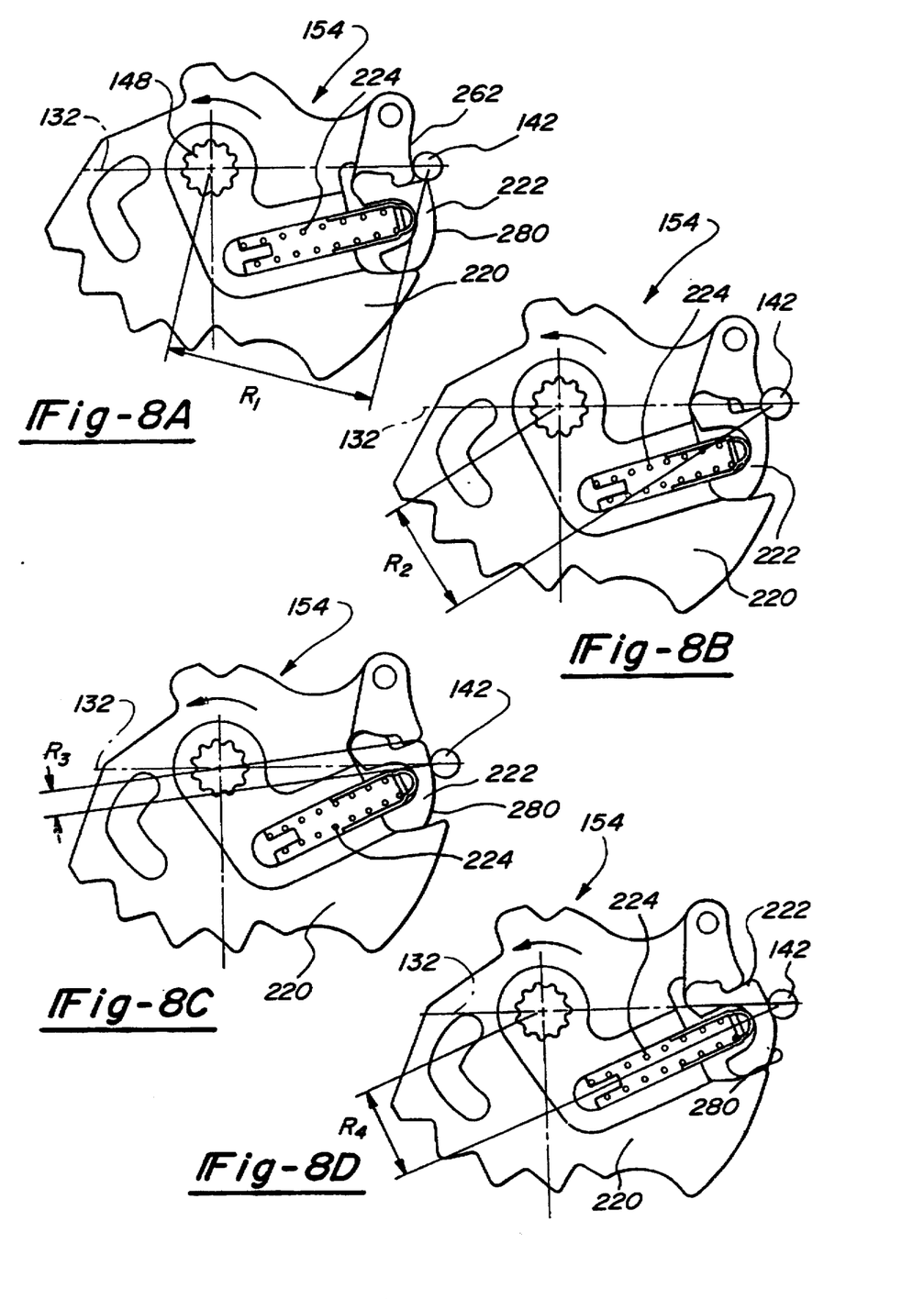
FIGS. 8A–E are diagrammatic plan elevational views showing a sequence of operating positions of the preferred embodiment two-piece sector plate of the present invention.

More specifically, referring to FIG. 8A, body 220 has been rotated slightly from the 2 wheel drive position of FIG. 3A. At the intermediate position shown in FIG. 8A, the cam block is in the full outwardly sprung position with mode pin 142 contacting on a tip of block camming surface 280 and a section of body camming surface 262. FIG. 8B shows body 220 in a further rotated position with cam block 222 in a fully compressed and solid orientation; the point of mode pin 142 contact is on the cam block tip. The synchronizer is being energized and the cone torque is beginning. Mode pin has traveled approximately fifty thousandths of an inch from the position of FIG. 3.

With reference to FIG. 8C, body 220 has continued to rotate toward the 4WH position. Cam block 222 remains in a fully compressed and solid position while mode pin 142 has further ridden along block camming surface 280 to an active (high output force) radius location. Mode pin 142 has been displaced about 150 thousandths of an inch from the FIG. 3A position. Full cone torque is present at this FIG. 8C action frame.

Figure 8E:
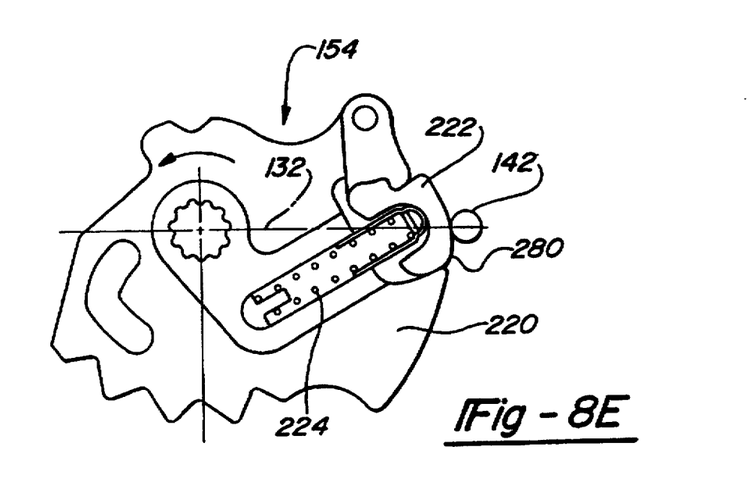

FIG. 8D illustrates cam block 222 in an almost fully outwardly sprung position with mode pin 142 having moved approximately another 150 thousandths of an inch along block camming surface 280. Tooth-butt could also occur when body 220 is disposed in this position. Finally, FIG. 8E shows the fully engaged 4WH rotational positions where mode pin 142 rests in a dwell location along camming surface 280 of cam block 222.

In general, the varying radius of the camming surfaces, through pivoting of cam block 222, is designed to exert maximum axial forces on mode pin 142 upon rotation of sector plate 154 when such forces are most needed or minimizing the axial forces exerted when such forces are least required, thereby effectively reducing two-wheel drive to four-wheel drive mode shift efforts. In other words, the camming surface effective radius is minimized as sector plate 154 is rotated toward the four-wheel drive mode position whereby the axial forces approach a more linearly vectored application. It is believed that this can be mathematically explained as follows with reference to FIG. 9.

Figure 9:
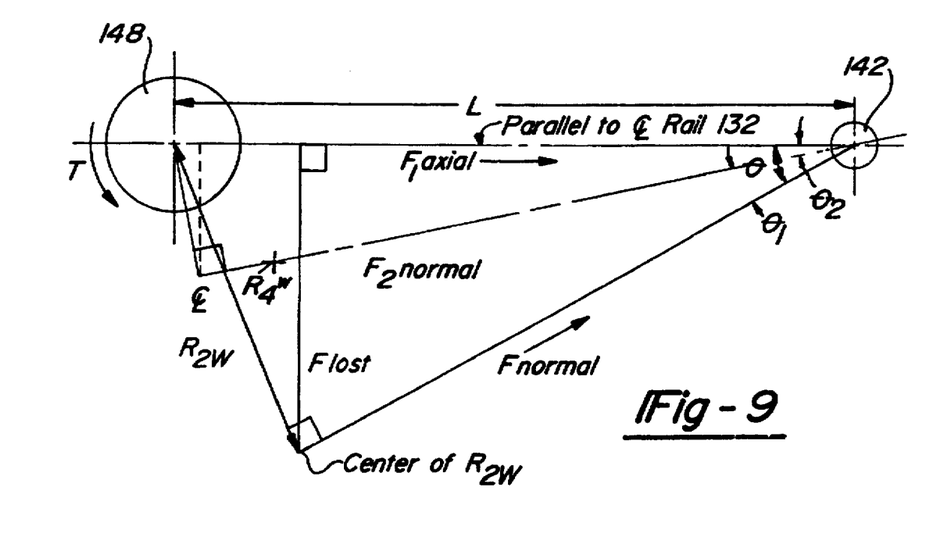
FIG. 9 is a free body diagram showing the forces created by operation of the preferred embodiment of the present invention two-piece sector plate.

The axial force ($F_A$) generated at mode pin 142 from a given sector plate input torque (T), angle ($\Theta$) and length (L) can be found by the following equations:

$$T = (F_n)(R)$$

where $F_N$—normal force $$SIN\Theta = \frac{R}{L}$$

where R=radius perpendicular to the line of action through pin 152 with the angle $\Theta$ being taken with respect to the centerline of the shift rail 132.

$$COS\Theta = \frac{F_A}{F_N}$$

$$F_A = (F_N)(COS\Theta)$$

$$F_A = \left(\frac{T}{R}\right)(COS\Theta)$$

$$F_A = \left(\frac{T}{(L)(SIN\Theta)}\right)(COS\Theta)$$

$$F_A = \frac{T}{(L)(TAN\Theta)}$$

This equation only applies if $R_{4W}$ falls within the 90° quadrant between the center of the sector and the pin itself, otherwise the length (L) would no longer be valid and another form of calculation would be required.

The intent of the present invention is to move the effective operating camming surface radius from $R_{2W}$ to $R_{4W}$ in order to increase the axial output force ($F_A$). The action can be observed in FIG. 10.

Figure 10:
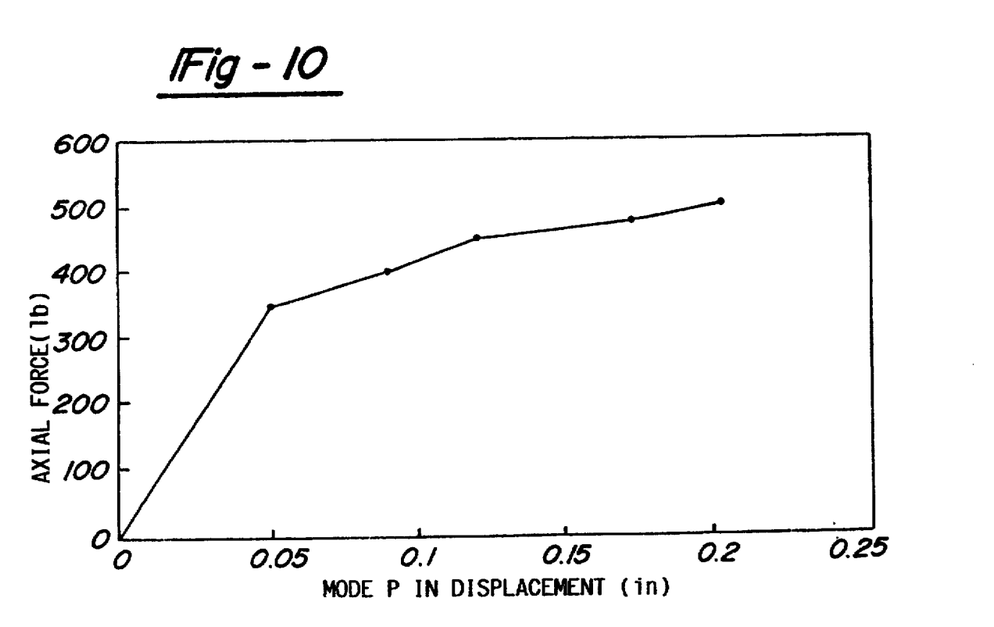
FIG. 10 is a graph showing mode pin displacement versus axial force observed by use of the preferred embodiment of the two-piece sector plate of the present invention.

FIG. 10 graphically illustrates axial force ($F_A$ or F) values of the preferred embodiment of the present invention two-piece sector plate versus the mode pin displacement. It is clearly shown that given a set input force (eg., 100 inch-pounds) the actual force increases well above the original one-piece cam until a maximum is reached. A 0.375 inch diameter mode pin was employed in this test.

The thickened portion of cam block 222, and the corresponding camming surface 280, move toward body 220 when a tooth-butt synchronization condition occurs, this lessens the effective sector plate radius as followed by mode pin 142. In this situation, spring 224 is mostly compressed such that the thickened portion of cam block 222 acts as if it were a unitary and solid member with body 220 thereby increasing output forces acting upon mode pin 142. The thickened portion and camming surface 280 of cam block 222 subsequently moves away from body 220, and back toward their nominal positions, upon synchronization indexing past the tooth-butt condition. Similarly, movement of the thickened portion of cam block 222 toward body 220 reduces double-bump synchronization input forces while acting to dampen high and low sector plate actuation forces. Cam block 222 additionally pivots in generally the same manner to overcome cold shifting force variations. Thus, not only does the vehicle driver perceive smoother, more consistent and lower effort manual shifting force requirements but an electric motor can also have a reduced size and torque requirements due to the use of the present invention two-piece sector plate.

While the preferred embodiment of this two-piece sector plate has been disclosed, it will be appreciated that various modifications may be made without departing from the present invention. For example, the cam block can move in a linear rather than, or in addition to, the disclosed pivoting movement. Furthermore, the shapes and orientations of the cam block and body sections can be alternately configured. Moreover, Belleville and diaphragm springs can be employed instead of the preferred compression springs. Various materials and manufacturing processes have been disclosed in an exemplary fashion, however, other materials and manufacturing processes may of course be employed. It is intended by the following claims to cover these and any other departures from the disclosed embodiments which fall within the true spirit of this invention.

The invention claimed is:

1. An apparatus for use in an automotive vehicle transfer case comprising a sector plate, said sector plate including:
   a sector body rotatable about a rotational axis;
   a portion of a single cam block being coupled to and moving relative to said sector body, said portion having a block camming surface, said portion of said cam block moving in a generally radial direction in relation to said sector body; and
   a shift rail mode pin contacting against said block camming surface when said sector body is rotated to a first position but not when said sector body is rotated to a second position.

2. The apparatus of claim 1 further comprising:
   a body camming surface located along a first edge of said sector body;
   said block camming surface disposed along an edge of said cam block; and
   said body camming surface and said block camming surface defining adjacent portions of an operatively continuous sector plate camming profile for moving said shift rail mode pin riding along said camming profile.

3. The apparatus of claim 2 wherein said shift mode pin only rides along said body camming surface when said sector body is disposed in a two-wheel drive shift position.

4. The apparatus of claim 3 wherein said shift mode pin only rides along said block camming surface when said sector body is disposed in a four-wheel drive shift position, said sector body being a single piece member.

5. The apparatus of claim 4 wherein said portion of said cam block has been moved toward said sector body when full cone torque synchronization occurs.

6. The apparatus of claim 1 further comprising a biasing device outwardly biasing at least said portion of said cam block away from said sector body.

7. The apparatus of claim 6 wherein said biasing device is defined as a compression spring having a first end disposed within a cavity of said sector body and having a second end disposed within a cavity of said cam block.

8. The apparatus of claim 1 wherein said portion of said cam block is moved toward said sector body when a synchronization tooth-butt condition occurs, said portion of said cam block returns to a nominal position away from said sector body when said synchronization tooth-butt condition is thereafter relieved.

9. The apparatus of claim 1 wherein movement of said portion of said cam block toward said sector body reduces double-bump synchronization input forces by acting to dampen high and low sector plate actuation forces.

10. The apparatus of claim 1 wherein an end of said cam block is pivotably affixed to said sector body.

11. The apparatus of claim 1 further comprising:
    an actuating shaft rotatably coupled to said sector plate;
    a range fork assembly having a range pin extending therefrom, said range pin riding within an elongated contoured slot disposed within said sector body;
    a mode pin riding along a peripheral edge profile of said sector plate defined by immediately adjacent camming surfaces of said sector body and said cam block; and
    a mode fork affixed to said mode pin.

12. The apparatus of claim 1 further comprising an electric motor operably rotating said sector plate.

13. A method of operating a sector plate employed in an automotive vehicle transfer case comprising the steps of:
    varying a camming surface radius upon which a fork mode member rides by moving a first portion of said camming surface in relation to a second portion of said camming surface in response to sector plate output force requirements;
    compressing a single spring between a body and a block having said first portion;
    moving said block relative to said body in at least one direction; and
    maintaining sector plate input force requirements generally the same regardless of shifting mode positions, regardless of synchronization steps and regardless of hot and cold temperature differences.

14. A sector plate for use in an automotive vehicle comprising a body, said body including:
    a peripheral edge having a camming edge profile segment;
    an aperture coaxially aligned with a rotational axis of said body;
    an arcuately contoured slot disposed internal to said body;
    a receptacle inwardly extending from said peripheral edge immediately adjacent to said camming edge profile segment;
    a set of shift mode indentations being disposed along a second edge segment of said peripheral edge; and
    a spring being at least partially located within said receptacle.

15. The sector plate of claim 14 wherein said body additionally includes an elongated channel inwardly extending from said receptacle.

16. The sector plate of claim 15 wherein said spring is a helically coiled spring compressibly disposed within said elongated channel of said body.

17. The sector plate of claim 14 further comprising a cam block pivotably coupled to said body, a portion of said cam block movably receivable within said receptacle of said body.

18. The sector plate of claim 17 wherein said cam block includes:
    a proximal portion having an opening pivotably coupled to said body;
    a neck portion extending from said proximal portion;
    a thickened portion extending from said neck portion, said thickened portion being thicker than said neck portion; and
    a camming edge profile segment being disposed along a peripheral edge of said thickened portion.

19. The sector plate of claim 14 wherein said set of indentations includes at least four triangularly-shaped indentations spaced adjacent to each other defining at least a two-wheel high shift mode, a four-wheel high shift mode, a neutral shift mode and a four-wheel low shift mode.

20. A method of operating a sector plate within an automotive vehicle transfer case comprising the steps of:
    (a) rotating a sector body of said sector plate;
    (b) pivoting a portion of a cam block in relation to said sector body about a single pivot coupled to said sector body; and
    (c) alternately riding a member coupled to a fork along camming surfaces defined by segments of said sector body and said cam block while moving said member from one of said camming surfaces to another of said camming surfaces and back again.

21. The method of claim 20 further comprising the steps of:
   (a) pivoting said portion of said cam block in relation to said sector body; and
   (b) outwardly biasing said portion of said cam block away from a portion of said sector body.

22. The method of claim 20 further comprising the sequential steps of:
   (a) moving said camming surface of said cam block toward said sector body when a tooth-butt synchronization condition occurs; and
   (b) moving said camming surface of said cam block away from said sector body upon synchronization indexing past said tooth-butt condition.

23. The method of claim 20 further comprising the step of reducing sector plate input torque force requirements by moving said camming surface of said cam block toward said sector body thereby reducing an effective camming radius acting against said member coupled to said fork.

24. A sector plate for use in an automotive vehicle comprising:
   (a) a body including:
      a peripheral edge having a camming edge profile segment;
      an aperture coaxially aligned with a rotational axis of said body;
      an arcuately contoured slot disposed internal to said body; and
      a receptacle inwardly extending from said peripheral edge immediately adjacent to said camming edge profile segment;
   (b) a cam block pivotably coupled to said body, a portion of said cam block being movably receivable within said receptacle of said body, said cam block including:
      a proximal portion having an opening pivotably coupled to said body;
      a neck portion extending from said proximal portion;
      a thickened portion extending from said neck portion, said thickened portion being thicker than said neck portion; and
      a camming edge profile segment being disposed along a peripheral edge of said thickened portion.

25. A method of operating a sector plate having a sector body employed in an automotive vehicle transfer case comprising the steps of: (a) reducing an effective camming surface radius of said sector plate by pivoting a cam block of said sector plate toward a central area of said sector plate, (b) pivoting said cam block relative to said central area about a fixed and single pivot that rotates with said central area (c) moving a camming surface of said cam block toward said sector body when a tooth-butt synchronization condition occurs; and (d) moving said camming surface of said cam block away from said sector body upon synchronization indexing past said tooth-butt condition.

26. The method of claim 25 further comprising the steps of collapsing said cam block when full cone torque synchronizing occurs.

27. The method of claim 25 further comprising the steps of positioning said cam block in uncollapsed dwell positions when said sector plate is fully disposed in two-wheel and four-wheel drive shift positions.

28. An apparatus for use in an automotive vehicle transfer case comprising a sector plate, said sector plate including:
   a sector body being rotatable about a rotational axis;
   a portion of a cam block being movably coupled to said sector body, said portion having a block camming surface, said cam block having a cavity; and
   a biasing device pushing at least said portion of said cam block away from said sector body, said biasing device being compressed when said portion moves toward said sector body, an end of said biasing device being disposed in said cavity.

29. The apparatus of claim 28 wherein an end of said cam block is pivotably affixed to said sector body.

30. The apparatus of claim 28 further comprising:
   a body camming surface being located along a first edge of said sector body;
   said block camming surface being disposed along an edge of said cam block; and
   a shift rail mode pin;
   said body camming surface and said block camming surface defining adjacent portions of an operatively continuous sector plate camming profile for moving said shift rail mode pin riding along said camming profile.

31. The apparatus of claim 30 wherein:
   said shift mode pin only rides along said body camming surface when said sector body is disposed in a two-wheel drive shift position;
   said shift mode pin only rides along said block camming surface when said sector body is disposed in a four-wheel drive shift position; and
   said sector body is a single piece member.

32. The apparatus of claim 28 wherein said biasing device is defined as a compression spring having a first end disposed within a cavity of said sector body and having a second end disposed within a cavity of said cam block.

* * * * *